Jan. 9, 1940.  H. J. LE VESCONTE  2,186,534
THREAD CONTROLLER
Filed Dec. 29, 1936  6 Sheets-Sheet 1
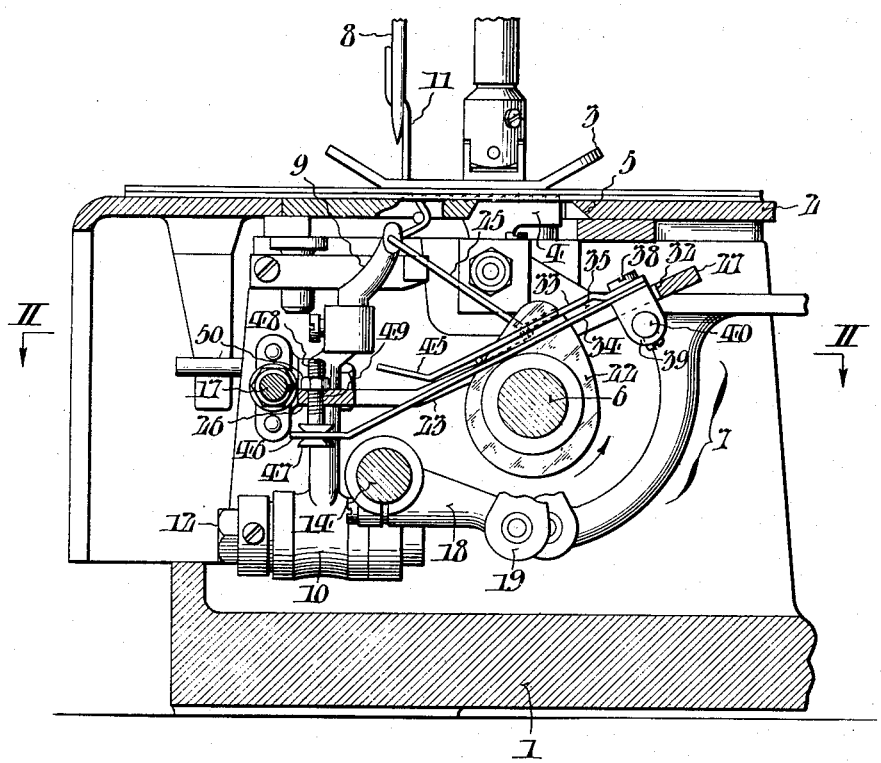
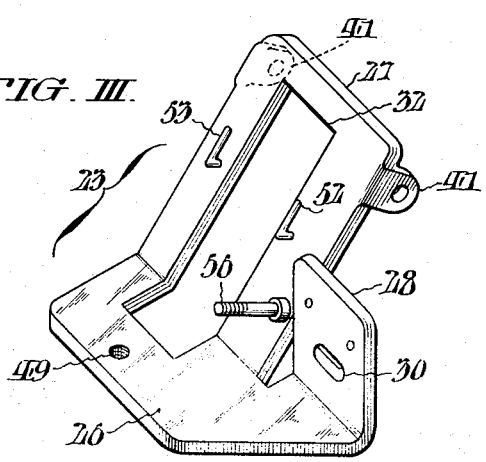
WITNESSES:
John C. Bergner
William Bell, Jr.
INVENTOR:
Harold J. LeVesconte
BY Frailey Paul
ATTORNEYS.

Jan. 9, 1940.  H. J. LE VESCONTE  2,186,534
THREAD CONTROLLER
Filed Dec. 29, 1936  6 Sheets-Sheet 2
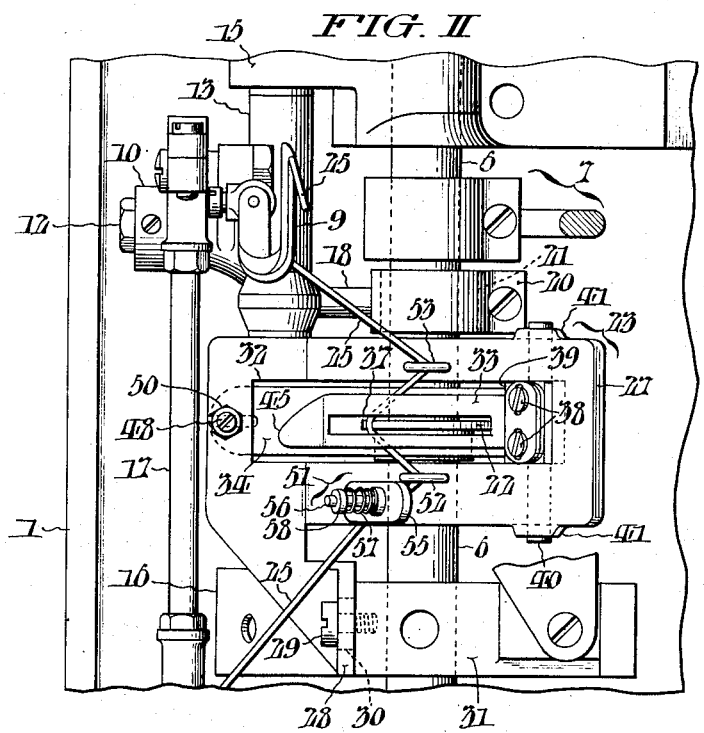
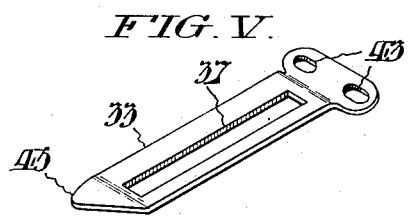
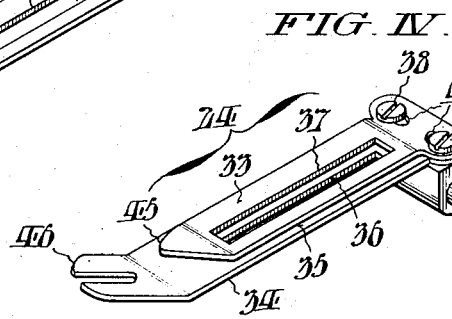
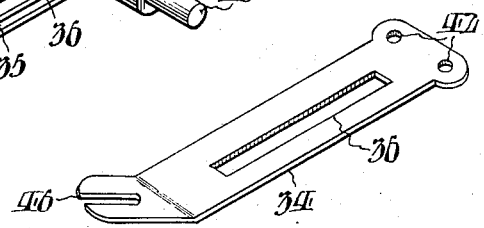
INVENTOR:
Harold J. Le Vesconte,
BY
ATTORNEYS.

Jan. 9, 1940. H. J. LE VESCONTE 2,186,534
THREAD CONTROLLER
Filed Dec. 29, 1936 6 Sheets-Sheet 3
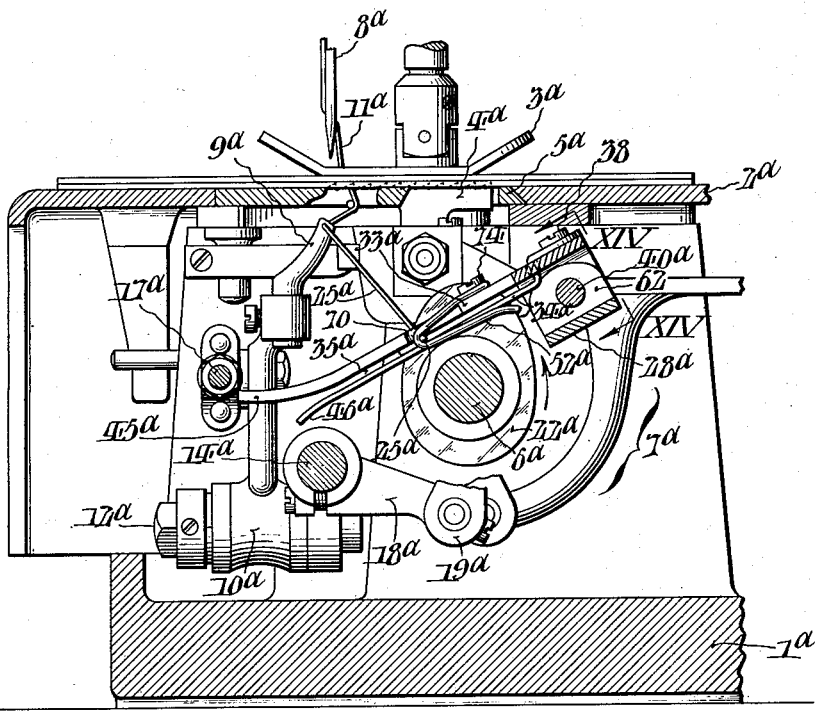

Jan. 9, 1940.    H. J. LE VESCONTE    2,186,534
THREAD CONTROLLER
Filed Dec. 29, 1936    6 Sheets-Sheet 4
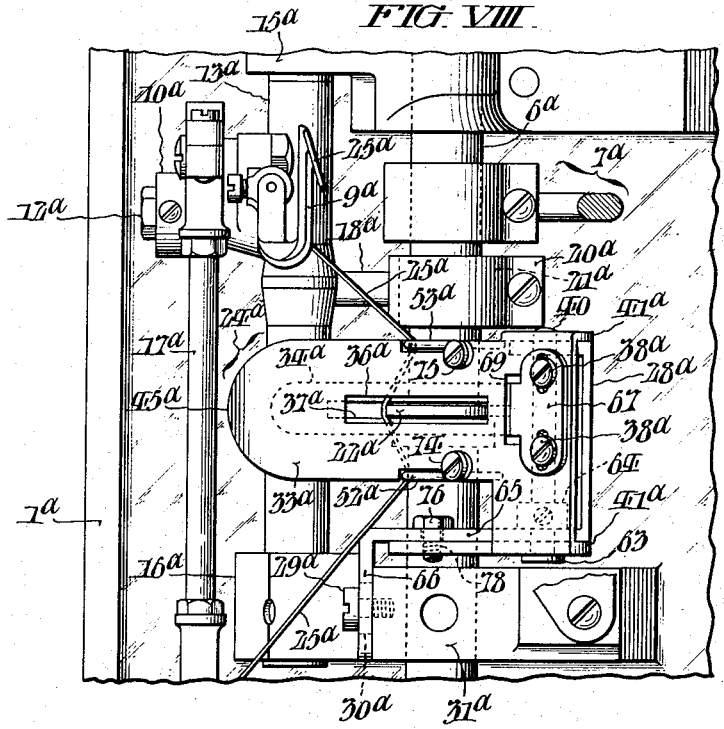
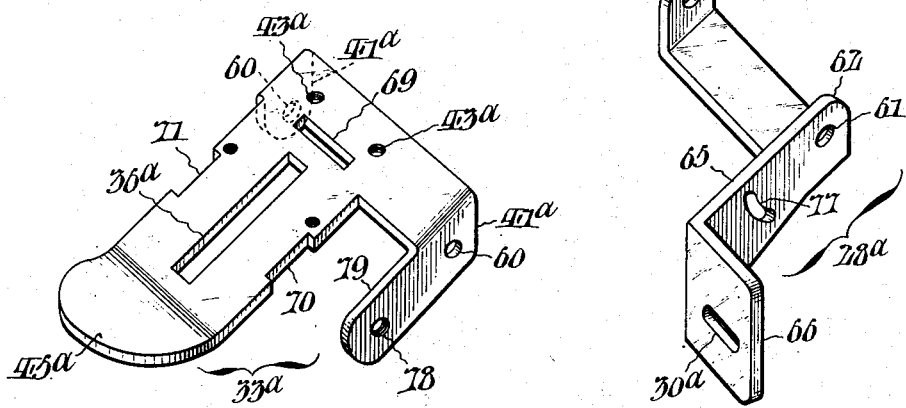
WITNESSES:
John C. Bergner
William Bell, Jr.
INVENTOR:
Harold J. LeVesconte,
BY Frally Paul
ATTORNEYS.

Jan. 9, 1940.   H. J. LE VESCONTE   2,186,534
THREAD CONTROLLER
Filed Dec. 29, 1936   6 Sheets-Sheet 5
FIG. XV.
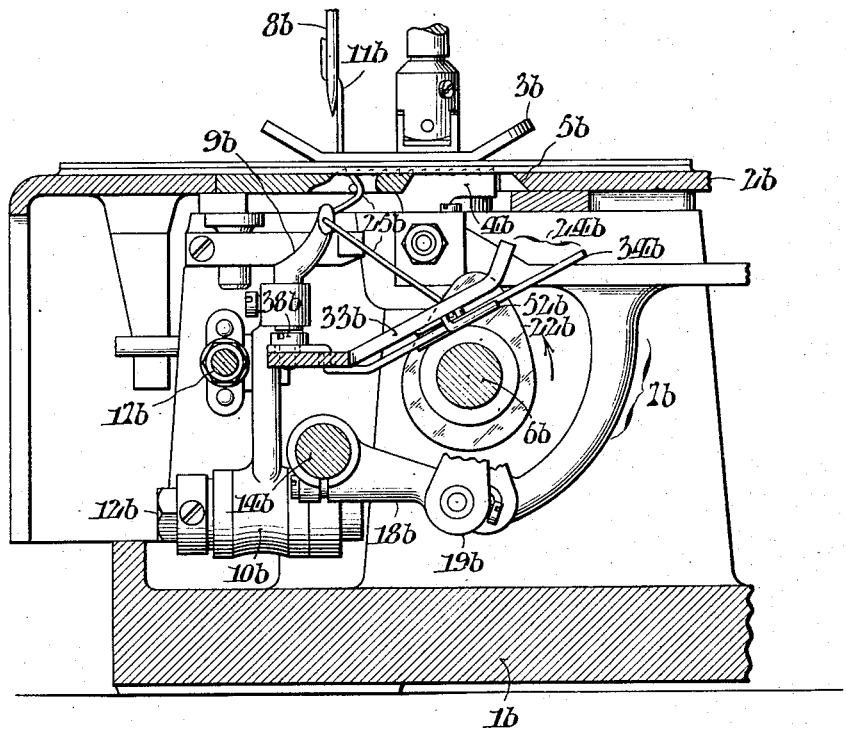
FIG. XVII.
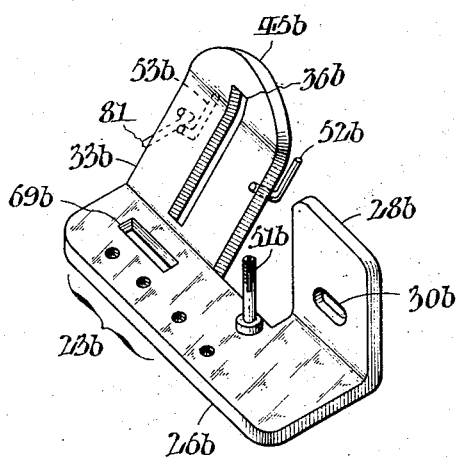
WITNESSES:
INVENTOR:
Harold J. LeVesconte,
BY
ATTORNEYS.

Jan. 9, 1940.                H. J. LE VESCONTE                2,186,534
                              THREAD CONTROLLER
                           Filed Dec. 29, 1936           6 Sheets-Sheet 6
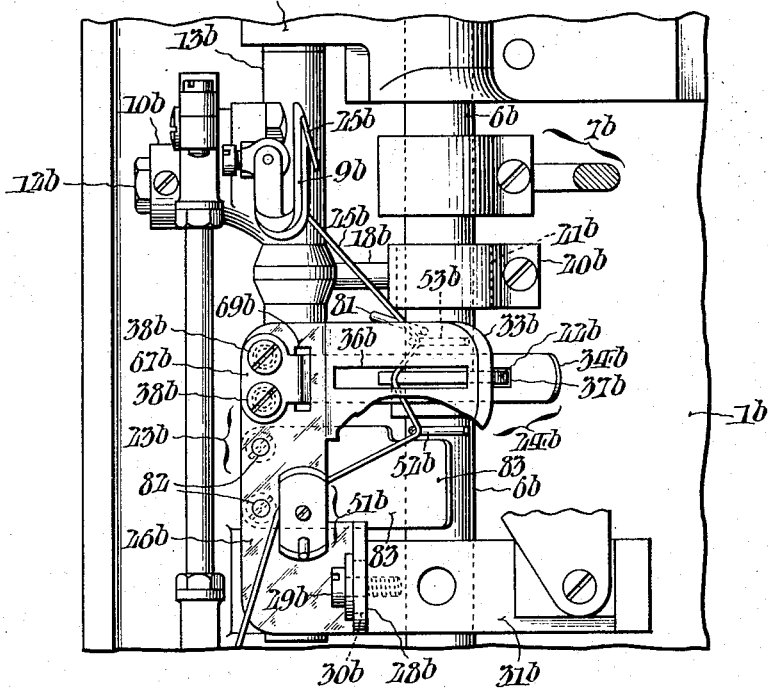
FIG. XVI.
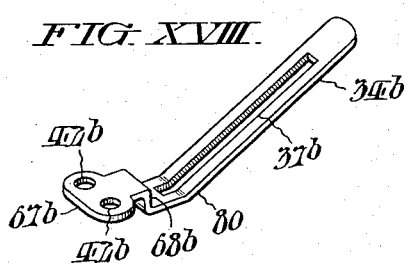
FIG. XVIII.
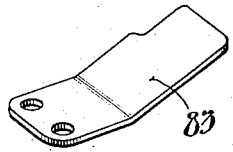
FIG. XIX.
WITNESSES:
John C. Bergner
William Bell, Jr.
INVENTOR:
Harold J. LeVesconte,
BY Fraley Paul
ATTORNEYS.

Patented Jan. 9, 1940

2,186,534

UNITED STATES PATENT OFFICE 2,186,534

THREAD CONTROLLER

Harold J. Le Vesconte, Western Springs, Ill., assignor to Union Special Machine Company, Chicago, Ill., a corporation of Illinois Application December 29, 1936, Serial No. 118,033

19 Claims. (Cl. 112—248)

This invention relates to thread controllers useful with sewing machines and the like in taking up upon the threads incident to stitching; and it has reference more particularly to thread controllers of the rotary type wherein the thread is displaced between a pair of transversely aligned stationary guides by a revolving disk cam while restricted to displacement in an interval afforded by a confining element in a plane tangential to the axis of said cam.

In connection with a thread controller of the specific type referred to, it is an object of my invention to provide for adjustment of the component parts of the confining element relative to each other and to the cam, with a view toward obviating the necessity for adherence to close tolerances in the fabrication of the parts and making it possible to compensate for inaccuracies of machining, incident to assembling them and placement of the controller in the sewing machine.

Another object of my invention is to enable adjustment of the confining element toward and away from the axis of the disk cam so that the amount of thread taken up during each rotation of the cam may be varied in accordance with the demands of the thread manipulating element or elements of the sewing machine.

Another object of my invention is to provide for adjustment of the interval in the confining element so that the controller can be adapted for use with threads of different sizes.

Other objects and attendant advantages will appear from the following detailed description of the attached drawings wherein Fig. I is a cross sectional view of a chain stitch sewing machine with a rotary thread controller conveniently embodying my invention in one form.

Fig. II is a plan sectional view taken as indicated by the arrows II—II in Fig. I.

Fig. III is a perspective view of a shield member forming a part of the controller.

Fig. IV is a perspective view of the thread confining element of the controller.

Figs. V and VI are detail views showing certain component members of the confining element in perspective.

Figs. VII and VIII are views corresponding to Figs. I and II showing an alternative form of my improved thread controller.

Figs. IX-XIII are detail perspective views of various parts of the alternative form of thread controller.

Fig. XIV is a fragmentary detail view looking as indicated by the arrows XIV—XIV in Fig. VII.

Figs. XV and XVI are views corresponding to Figs. I and II showing still another alternative form of my improved thread controller.

Figs. XVII-XIX are perspective views of various parts of the last mentioned alternative embodiment.

With more specific reference first to Figs. I and II of these drawings, the sewing machine there shown for convenience of exemplifying my invention has a laterally open base 1 with a horizontal plate 2 at the top which constitutes the work support for the fabric (not illustrated) sewed in the machine. During the sewing, the fabric is held down on the work support 2 by a presser foot 3 incident to being advanced by a feed dog 4 which operates in a transverse slot 5 in said work support. The feed dog derives its feed and lift movements from the main longitudinal drive shaft 6 of the machine through suitable mechanism which is partly shown at 7 and which need not be described in detail since it is not pertinent to my invention. During normal operation of the machine, the shaft 6 rotates in the direction of the arrow shown in Fig. I. Cooperative with the vertically-reciprocating needle 8 of the machine in the formation of chain stitches is a looper 9 whereof the carrier is indicated at 10. As shown, the looper carrier 10 is pivoted for oscillatory movement of the looper 9 crosswise of the direction of fabric feeding to take and shed the loops of the needle thread 11, about a lateral stud 12 on a rocker 13 which is secured to a shaft 14 journaled in fixed bearings 15, 16 on the base 1. The looper 9 is moved as just described, through the medium of a connecting rod 17 by a suitable actuator, not shown. Lateral needle avoiding movements are imparted to the looper 9 through rocking of the shaft 14 by means of an arm 18 on the latter, which arm is connected to the pendant arm 19 (Fig. I) of a strap 20 (Fig. II) embracing an eccentric 21 on the main shaft 6 of the machine.

The form of my improved thread controller featured in Figs. I and II includes a disk cam 22 which is secured to the shaft 6; a shield element 23, and a confining element 24 for the looper thread, which latter is indicated at 25, said shield element and said confining element being separately illustrated in perspective in Figs. III and IV. As shown, the shield element 23 is fashioned from relatively stout plate metal with a horizontal portion 26; an upwardly inclined rectangular portion 27 which, in the sewing machine, is adapted to overreach the main shaft 6 in the region of the rotary cam disk 22; and an attaching bracket portion 28. By means of a screw 29 passing through a horizontal slot 30 in the bracket portion 28, the shield element 23 is adjustably secured to a bearing lug 31 on the machine base 1, see Fig. II. For a purpose which will presently become apparent, the shield element 23 is provided with a rectangular opening 32 which extends longitudinally of the inclined portion 27 and partway into the horizontal portion 26. The thread confining element 24, it will be noted from Fig. IV, includes two elongate tongue-like components 33, 34 which are fashioned from plate metal somewhat thinner than that of the shield element 23, and which are separately illustrated in Figs. V and VI respectively. These components 33, 34 are arranged in superimposition and spaced with provision of a narrow interval 35 for confinement of the looper thread 25 to a plane tangential to the cam axis, and formed respectively with longitudinal slots 36, 37 in which the disk cam 22 operates. By means of a pair of screws 38, the components 33, 34 of the confining element 24 are secured at one end to a block 39 which is affixed to a shaft 40 whereof the opposite ends are journaled in downwardly bent bearing ears 41 at the top of the inclined portion 27 of the shield element 23. From Fig. VI, it will be observed that the component 34 is provided with circular holes 42 of a size slightly larger than the diameter of the shanks of the securing screws 38, and from Fig. V, that the component 33 is provided with transversely elongate slots 43 of a corresponding width, so that these parts can be relatively adjusted as later on explained. As shown in Fig. II, the block 39 exactly fits the opening 32 in the shield 23 and prevents axial shifting of the shaft 40 in its bearings 41. It will be further noted from Fig. II that the tongue 33 is somewhat narrower than the tongue 34, and that it has its free end tapered and bent upwardly at an angle as at 45 to facilitate insertion of the looper thread 25 into the interval 35 incident to threading of the sewing machine. The tongue 34 is in turn somewhat narrower than the opening 32 in the shield element 23 so as to be movable thereinto, and has its free end clevised and bent upwardly at an angle as at 46 to underreach the horizontal portion 26 of said shield element and to embrace the circumferentially grooved head 47 of an adjusting screw 48 which engages a tapped hole 49 (Figs. I and III) in the shield element. As shown in Figs. I and II, the adjusting screw 48 is provided at its upper end with a screw driver slot, and associated with it is a jam nut 50 which coacts with the upper surface of the horizontal portion 26 of the shield element 23 in securing the screw in adjusted positions. Enroute to the looper 9 from a source of supply (not shown), the looper thread 25 first passes through a tension device 51; then through an upwardly-open guide hook 52 on the inclined portion 27 of the shield element 23 at one side of the opening 32 and substantially in the vertical plane of the shaft 6; then transversely of the interval 35 between the tongue components 33, 34 of the confining element; and finally through another similarly positioned upwardly-open guide hook 53 on the shield element 23 at the other side of the opening 32. As shown in Fig. II, the tension device 51 consists of a plate 55 between which and the upper surface of the inclined portion 27 of the shield element 23, the looper thread 25 passes, said plate being apertured for guidance by an upstanding stud 56 on said shield element and being yieldingly urged downward by a helical spring 57 whereof the pressure is regulatable by a thumb nut 58 on said stem.

By virtue of the described construction, it is possible to adjust the component 33 of the confining element 24 laterally for accurate centralization of its longitudinal slot 37 with the longitudinal slot 36 of the component 34 and with the disk cam 22, and also to angularly adjust said components individually as may be required to insure absolute parallelism of said slots with the sides of said cam. In addition, the shield element 23 can be adjusted longitudinally of the shaft as a consequence of the horizontal slot 30 in its bracket portion 28. These several adjustments are obviously advantageous in that compensation may be made during setting up of the controller in the sewing machine for slight inaccuracies in the fabrication of the parts or in the machining of the lug 31 to which the shield element 23 is secured.

The operation of the thread controller is as follows:

With the main shaft 6 rotating in the direction of the arrow in Fig. I and movement of the high portion of the disk cam 22 into the registering longitudinal slots 36, 37 of the confining element 24, the portion of the looper thread 25 extending between the hook guides 52, 53 is distended within the interval 35 as shown in Figs. I and II, during each rotation of the disk cam 22 and an exact amount of the thread taken up. Through adjustment of the element 24 and the element 23 carried thereby up or down on its pivotal mounting and relative to the axis of the cam shaft by means of the adjusting screw 48, I am able to vary the amount of thread taken up at each actuation of the rotary cam 22 as required for different adjustments of the looper 9, the shield element 23 and the component 34 together serving as a barrier over the shaft 6 in the vicinity of the disk cam 22 to prevent the splashing of oil from said shaft from soiling the looper thread 25, and also to prevent said thread from being accidentally fouled by and wrapped around the shaft. In threading the machine, the looper thread 25 is first inserted from above into the hook guides 52, 53 and the portion thereof between said guides thereupon pulled and inserted into the open end of the interval 35 between the components 33, 34 of the confining element 24.

In the alternative embodiment of my invention shown in Figs. VII-XIV, the component 33a of the confining element is substantially as wide as the inclined portion 27 of the shield element 23 of the first described form, and provided at opposite sides of its top end with bearing ears 41a. As shown, the bearing ears 41a are apertured as at 60 for a shaft 40a whereof the ends engage apertures 61 in upturned ears 62 of a bracket element 28a. Axial displacement of the shaft is prevented by head 63 and collar 64 thereon, see Fig. XIV. As shown in Figs. VIII and X, one of the ears 62 of the bracket element 28a is extended forwardly as at 65 and has its end 66 bent outwardly at right angles and formed with a horizontal slot 30a for passage of a screw 29a whereby said bracket element is secured, with capacity for adjustment longitudinally of the shaft 6a, to the bearing lug 31a on the sewing machine base 1a. The other component 34a of the confining element 24a has the configuration of a tongue with a longitudinal slot 37a of a width to clear the cam disk 22a by a slight working margin in registry with the wider longitudinal slot 36a of the component 33a. The component 34a is secured by screws 38a which pass through transverse slots 42a in its widened attaching end portion 67 and take into tapped holes near the top of the component 33a. As shown, the component 34a is offset at 68 for passage through a transverse clearance slot 69 in the component 33a and underreaches the tongue portion of the latter component with provision of a narrow confining interval 35a for the looper thread 25a. The free ends of the components 33a, 34a are oppositely bent as at 45a, 46a to facilitate insertion of the looper thread 25a into the interval 35a; and the tongue portion of said component 33a is notched at opposite sides as at 70 and 71 to accommodate downwardly and rearwardly bent guide hooks 52a, 53a for the looper thread 25a. As shown, the guide hooks 52a, 53a are formed with eyes 72, 73 which extend inwardly over the top of the tongue portion of the component 33a whereto they are secured by screws 74, 75 passing through said eyes. As in the first described embodiment, the confining component 24a is swingable about its pivotal support toward and away from the shaft 6a to vary the amount of thread measured or taken up by the disk cam 22a during each rotation thereof. In this instance, the confining element 24a is securable in adjusted positions by a headed clamp screw 76 which extends through an arcuate slot 77 in the portion 65 of the bracket 28a and which takes into a tapped hole 78 in the extended portion 79 of one of the ears 41a of the component 33a. By virtue of its transverse slots, the component 34a is angularly and laterally adjustable in relation to the tongue portion of the component 33a and the disk cam 22a, and the latter component adjustable longitudinally of the shaft 6a as a consequence of the provision of the horizontal slot 30a in the bracket element 28a for reasons analogous to those described in connection with the first embodiment. In order to dispense with the necessity for duplicate description, all the other illustrated parts not specifically referred to in Figs. VII-XIV but having their duplicates in Figs. I-VI have been identified with the same reference numerals previously employed except for the addition in each instance of the letter "a" for convenience of distinction.

Figs. XV-XIX show a modification of my invention in which the two components 33b, 34b of the confining element 24b are reversed in position, said elements being secured together at the front of the machine and extending upwardly and rearwardly at an inclination over the shaft 6b. The component 33b is, in this case, formed as an inclined tongue portion of an element 23b which generally resembles the shield element 23 of the first described embodiment and which is formed with a horizontal portion 26b as well as with a horizontally-slotted vertical bracket portion 28b for attachment, by means of a securing screw 29b to the bearing lug 31b of the sewing machine base 1b. Except for being angularly bent at 80 to correspond with the inclination of the tongue 33b, the component 34b of the confining element 24b is similar to the component 34a shown in Fig. XI. The holes 42b in the attaching portion 67b of the component 34b are considerably larger than the shanks of the securing screws 38b so as to enable lateral, longitudinal and transverse angular adjustment of said component in respect to the tongue portion 33b of the element 23b and the disk cam 22b. Since the attaching portion 67b of the tongue 34b bearing on the horizontal portion 26b of the element 23b has an angular relationship to the tongue 33b, the interval 35b can obviously be narrowed or widened to adapt the controller for threads of different sizes as permitted by the ample width of the slot 69b in the horizontal portion 26b of the element 23b. In this embodiment, the hook guides 52b, 53b are secured to the under side of the tongue 33b and open rearwardly in a direction opposite to that of thread displacement as does the interval 35b which is readily accessible for threading through upward bending of the free end of said tongue at 45b. An additional oppositely-directed hook guide 81 cooperates with the hook guide 53b in preventing the thread from being displaced from the interval 35b during reverse rotation of the disk cam 22b. The tension device 51b is in this instance supported by the element 23b which affords the tongue 33b of the confining element 24b, to the horizontal portion 26b of which element is secured, by a pair of screws 82, an angularly bent guard plate 83. This plate 83 closes the gap between the tongue 33b and the bracket portion 28b of the element 23b and prevents the thread 25b from being accidentally fouled by, and wrapped upon the shaft 6 in the region of the tensioning device 51b. The thread confining element constituted by the parts 33b, 34b is adjustable toward and away from the axis of the cam shaft 6b by swivel movement of the part 26b on the screw 29b to vary the amount of thread displaced by the cam 22b during each rotation of the lattter.

All other elements shown but not specifically referred to in Figs. XV-XIX and having their counterparts in the aforedescribed embodiments are likewise designated by the same reference numerals previously used with addition however, in each instance, of the letter "b" for convenience of dispensing with duplicate description.

My invention in its various forms is not necessarily confined to controlling the looper thread or threads in a sewing machine, since by suitable modifications within the scope of the appended claims, it can be adapted, with attainment of advantages equal in all respects to those hereinbefore pointed out, for controlling the needle thread or threads of such machines.

Having thus described my invention, I claim:

1. A thread controller comprising a rotary thread-engaging disk cam; transversely-aligned thread guides at opposite sides of the disk cam; a thread confining element consisting of a pair of superposed components with longitudinal slots through which the cam operates, said components being spaced to afford a longitudinal interval in a plane parallel to the cam axis for confining the portion of the thread measured or taken up by the cam between the guides; and means whereby the components of the confining element can be individually adjusted laterally of the cam and said components bodily adjusted toward and away from the axis of the cam to vary the amount of thread displaced by the cam during each rotation thereof.

2. A thread controller comprising a rotary thread-engaging disk cam; transversely-aligned thread guides at opposite sides of the disk cam;

a thread confining element consisting of a pair of superposed components with longitudinal slots through which the cam operates, said components being spaced to afford a longitudinal interval in a plane parallel to the cam axis for confining the portion of the thread measured or taken up by the cam between the guides; means whereby the upper component of said element can be laterally adjusted in respect to the lower component; and means whereby the lower component can be adjusted relative to the axis of the cam to vary the amount of thread displaced by the cam during each rotation thereof.

3. A thread controller comprising a rotary thread-engaging disk cam; transversely-aligned thread guides at opposite sides of the disk cam; a thread confining element having a slot through which the disk cam operates and affording one side of a longitudinal interval in a plane parallel to the cam axis for confining the portion of the thread measured or taken up by the cam between the guides; and means supporting the confining element with capacity for adjustment toward and away from the cam axis to vary the amount of thread displaced by the cam during each rotation thereof.

4. A thread controller comprising a rotary thread-engaging disk cam; transversely-aligned thread guides at opposite sides of the disk cam; a thread confining element having a slot through which the disk cam operates and affording a longitudinal interval in a plane parallel to the cam axis for confining the portion of the thread measured or taken up by the cam between the aforesaid guides; and means pivotally supporting the confining element with capacity for adjustment toward and away from the cam axis to vary the amount of thread displaced by the cam during each rotation thereof.

5. A thread controller comprising a rotary thread-engaging disk cam; transversely-aligned thread guides at opposite sides of the disk cam; a thread confining element having a slot through which the disk cam operates and affording a longitudinal interval in a plane parallel to the cam axis for confining the portion of the thread measured or taken up by the cam between the guides; means pivotally supporting the confining element at one end; and regulating means coordinated with the other end of the confining element whereby said element can be moved about its pivot toward and away from the cam axis to vary the amount of thread displaced by the cam during each rotation thereof.

6. A thread controller comprising a rotary thread-engaging disk cam; transversely-aligned thread guides at opposite sides of the disk cam; a thread confining element having a slot through which the disk cam operates and affording a longitudinal interval in a plane parallel to the cam axis to confine the portion of the thread measured or taken up by the cam between the guides; a shield adapted to overreach a shaft whereon the cam is mounted, said shield supporting the thread guides and having an opening to receive the confining element, and means whereby the thread confining element can be adjusted relative to the shield in a direction toward and away from the axis of the cam to vary the amount of thread displaced by the cam during each rotation thereof.

7. A thread controller comprising a rotary thread-engaging disk cam; transversely-aligned thread guides at opposite sides of the disk cam; a thread confining element having a slot through which the disk cam operates and affording a longitudinal interval in a plane parallel to the cam axis for confining the portion of the thread measured or taken up by the cam between the guides; a shield adapted to overreach a shaft whereon the cam is mounted, said shield supporting the thread guides and having an opening for reception of the confining element; and means whereby the confining element can be adjusted within said opening toward and away from the cam axis to vary the amount of thread displaced by the cam during each rotation thereof.

8. A thread controller comprising a rotary thread-engaging disk cam; transversely aligned thread guides at opposite sides of the disk cam; a thread confining element having a slot through which the disk cam operates and affording a longitudinal interval in a plane parallel to the cam axis for confining the portion of the thread measured or taken up by the cam between the guides; a shield adapted to overreach a shaft whereon the cam is mounted, said shield having an opening for reception of the confining element and affording the latter pivotal support; and means whereby the confining element can be adjusted on its pivot toward and away from the cam axis to vary the amount of thread displaced by the cam during each rotation thereof.

9. A thread controller comprising a rotary thread-engaging disk cam; transversely-aligned thread guides at opposite sides of the disk cam; a thread confining element having a slot through which the disk cam operates and affording a longitudinal interval in a plane parallel to the cam axis for confining the portion of the thread measured or taken up by the cam between the guides; a shield adapted to overreach a shaft whereon the cam is mounted, said shield having an opening for reception of the confining element and affording the latter pivotal support at one end; and regulating means coordinated with the other end of the confining element whereby the same can be moved about its pivot toward and away from the cam axis to vary the amount of thread displaced by the cam during each rotation thereof.

10. A thread controller comprising a rotary thread-engaging disk cam; transversely-aligned thread guides at opposite sides of the disk cam; a thread confining element having a slot through which the disk cam operates and affording a longitudinal interval in a plane parallel to the cam axis for confining the portion of the thread measured or taken up by the cam between the guides; a shield adapted to overreach a shaft whereon the cam is mounted, said shield having an opening for reception of the confining element and affording the latter pivotal support at one end; and a regulating screw coordinating the other end of the confining element with the shield whereby said element can be moved about its pivotal support to vary the amount of thread displaced by the cam at each rotation thereof.

11. A thread controller comprising a rotary thread-engaging disk cam; transversely-aligned thread guides at opposite sides of the disk cam; a thread confining element having a slot through which the disk cam operates and affording a longitudinal interval in a plane parallel to the cam axis for confining the portion of the thread measured or taken up by the cam between the guides; a shield overreaching a shaft whereon the cam is mounted, said shield supporting the thread guides and having an opening for reception of the confining element; and means whereby the confining element can be adjusted within said opening toward and away from the cam axis to vary the amount of thread displaced by the cam during each rotation thereof; and means for supporting the shield with capacity for adjustment longitudinally of the shaft.

12. A thread controller comprising a rotary thread-engaging disk cam; transversely-aligned thread guides at opposite sides of the disk cam; a thread confining element having a slot through which the disk cam operates and affording a longitudinal interval in a plane parallel to the cam axis for confining the portion of the thread measured or taken up by the cam between the guides; a shield overreaching a shaft whereon the cam is mounted, said shield supporting the thread guides and having an opening for reception of the confining element; and means whereby the confining element can be adjusted within said opening of the shield toward and away from the cam axis to vary the amount of thread displaced by the cam during each rotation thereof; and a tension device on the shield through which the thread passes enroute to the guides.

13. A thread controller comprising a rotary thread-engaging disk cam; transversely-aligned thread guide hooks at opposite sides of the cam open in a direction opposite to that in which the yarn is displaced by the cam; a thread-confining element having a slot through which the disk cam operates and affording a longitudinal interval in a plane parallel to the cam axis for confining the portion of the thread measured or taken up by the cam between the hook guides, said interval being open in the direction of thread displacement beyond the range of the cam; and means supporting the confining element with capacity for adjustment toward and away from the cam axis to vary the amount of thread displaced by the cam during each rotation thereof.

14. A thread controller comprising a rotary thread-engaging disk cam; transversely-aligned thread guides at opposite sides of the disk cam; and a thread confining element consisting of a pair of superposed components with longitudinal slots through which the cam operates, said components being spaced to afford a longitudinal interval in a plane parallel to the cam axis for confining the portion of the thread measured or taken up by the cam between the guides, and the upper one of said components carrying the thread guides.

15. A thread controller comprising a rotary thread-engaging disk cam; transversely-aligned thread guides at opposite sides of the disk cam; a thread confining element consisting of a pair of superposed components with longitudinal slots through which the cam operates, said components being spaced to afford a longitudinal interval in a plane parallel to the cam axis for confining the portion of the thread displaced by the cam between the guides; a bracket by which the thread confining element is pivotally supported with capacity for adjustment toward and away from the cam axis to vary the amount of thread measured or taken up by the cam during each rotation thereof; and a clamp screw passing through an arcuate slot in the bracket concentric with the pivot axis and engaging a threaded aperture in the confining component to secure the latter in adjusted positions.

16. A thread controller comprising a rotary thread-engaging disk cam; transversely-aligned thread guides at opposite sides of the disk cam; a thread confining element having a slot through which the disk cam operates and affording a longitudinal interval in a plane parallel to the cam axis for confining the portion of the thread measured or taken up by the cam between the guides; and means whereby the width of the longitudinal interval between the two components of the confining element can be adjusted to adapt the controller for threads of different sizes.

17. A thread controller comprising a rotary thread-engaging disk cam; transversely-aligned thread guides at opposite sides of the disk cam; a thread confining element having a slot through which the disk cam operates and affording a longitudinal interval in a plane parallel to the cam axis for confining the portion of the thread measured or taken up by the cam between the guides, said components being formed with angularly bent portions at corresponding ends and there secured together with capacity for being longitudinally shifted relatively to vary the interval between them, for adaptation of the controller to threads of different sizes.

18. A thread controller comprising a rotary thread-engaging disk cam; transversely-aligned thread guides at opposite sides of the disk cam; a thread confining element consisting of a pair of superposed components with longitudinal slots through which the cam operates, said components being spaced to afford a longitudinal interval in a plane parallel to the cam axis for confining the portion of the thread measured or taken up by the cam between the guides; and means whereby the components of the confining element can be adjusted relative to each other to vary the space between them for different gauges of thread, and whereby they can be adjusted together relative to the axis of the cam to vary the amount of thread measured during each rotation of said cam.

19. A thread controller comprising a rotary thread-engaging member; a stationary member for confining the thread to travel crosswise of the path of the rotating member, said thread confining member providing an interval in a plane parallel to the axis of the rotary member in which the thread is permitted to move back and forth laterally; and means whereby the thread confining member can be adjusted toward and away from the axis of the rotary member to vary the amount of thread measured or taken up by said rotary member.

HAROLD J. LE VESCONTE.